United States Patent [19]

van den Berg et al.

[11] 4,343,064
[45] Aug. 10, 1982

[54] DEVICE FOR CONNECTING A WIPER BLADE HOLDER TO A WIPER ARM

[75] Inventors: Johan H. van den Berg, Hasselt, Belgium; Guiseppe Maiocco, Rivoli, Italy

[73] Assignee: Champion Spark Plug Europe S.A., Virton, Belgium

[21] Appl. No.: 109,555

[22] Filed: Jan. 4, 1980

[30] Foreign Application Priority Data

Jan. 5, 1979 [IT] Italy .................. 67020 A/79

[51] Int. Cl.³ .................. B60S 1/40
[52] U.S. Cl. .................. 15/250.32
[58] Field of Search .................. 15/250.31–250.42; 403/163, 188, 189

[56] References Cited

U.S. PATENT DOCUMENTS

| 3,961,394 | 6/1976 | Steger | 15/250.32 |
| 4,114,227 | 9/1978 | Blackman | 15/250.32 |
| 4,118,825 | 10/1978 | Hoebrecht et al. | 15/250.32 |
| 4,169,298 | 10/1979 | Smith | 15/250.33 |
| 4,261,074 | 4/1981 | Bauer et al. | 15/250.32 |

FOREIGN PATENT DOCUMENTS

| 2251502 | 5/1973 | Fed. Rep. of Germany | 15/250.32 |
| 2340481 | 2/1975 | Fed. Rep. of Germany | 15/250.32 |
| 1433668 | 4/1976 | United Kingdom | 15/250.32 |

*Primary Examiner*—Peter Feldman
*Attorney, Agent, or Firm*—Wegner, Stellman, McCord, Wood & Dalton

[57] ABSTRACT

A connector or adaptor is provided for connecting a windshield wiper arm (1) to a superstructure (5) of a windshield wiper blade. The arm end has aligned bores (2) and a spring clip (3) for securing the arm to a pin on a blade. The connector or adaptor is a one or two part member (10, 11, 23, 32, 42) which is secured to a rivet (7) on the blade and has laterally located, sidewardly extending pins (21) for engagement with the arm end or has vertically located, sidewardly extending pins (31, 41) for engagement with the arm end.

10 Claims, 15 Drawing Figures

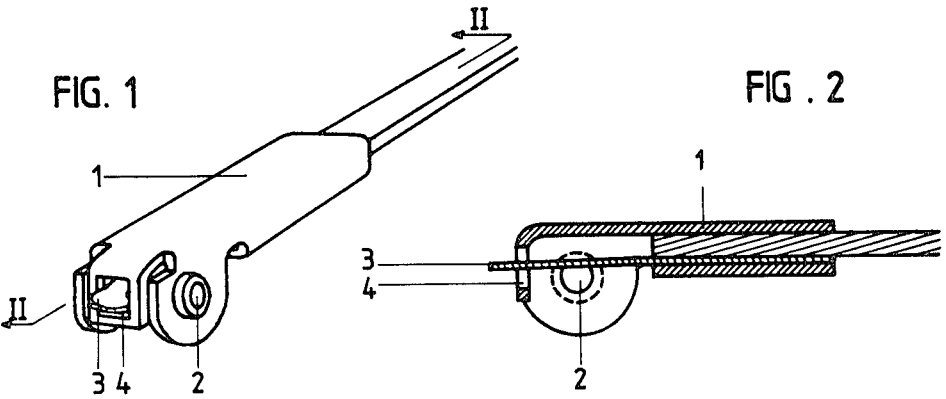
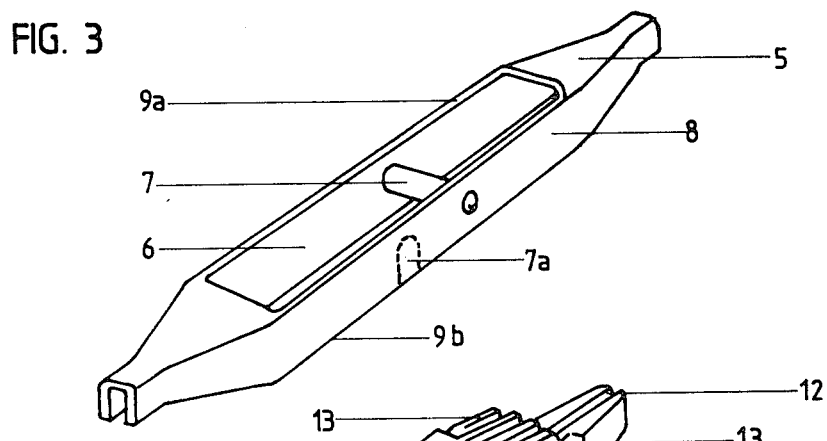
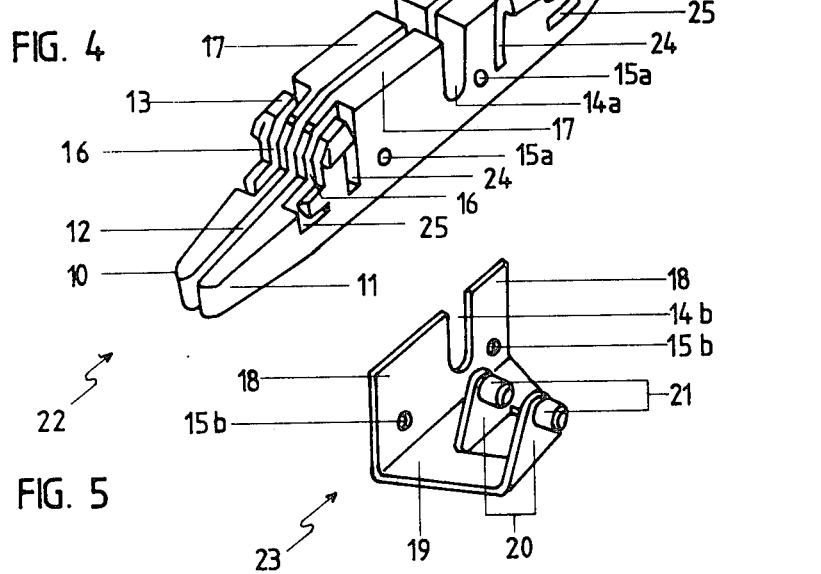

DEVICE FOR CONNECTING A WIPER BLADE HOLDER TO A WIPER ARM

DESCRIPTION

Technical Field

This invention relates to improvements in the connecting device of a wiper blade holder to the free end portion of a corresponding wiper arm. The connecting devices or connectors are, for example, mounted on the wiping systems of motor vehicles.

Background Art

U.S. Pat. No. 4,114,227, issued Sept. 19, 1978, relates to a lateral connecting device for wiper blades which have been especially designed for being coupled with wiper arms of the lateral type, provided with a bore which receives a lateral pivot pin and possibly provided with a flexible spring clip which blocks the pivot pin in said bore. The wiper blades constructed in accordance with the disclosure of said U.S. Pat. No. 4,114,227 can only be used in connection with a lateral wiper arm as described above and, for example, they cannot be used in connection with a wiper arm designed for a dorsal fitting to the wiper blade.

Indeed, the connecting devices disclosed in said patent are rigidly fixed to the holder or superstructure of the wiper blade.

The present invention is directed to overcoming one or more of the problems as set forth above.

Disclosure of the Invention

According to the present invention, the lateral connecting devices are easily connected to and disconnected from a very commonly used wiper blade designed for a dorsal fitting of the wiper arm.

Such removable connectors offer very important advantages for the manufacture as well as for the customer. The manufacturer no longer needs to develop and produce two series of wiper blades: one with a lateral fitting and one with a dorsal fitting. The manufacturing costs are thus reduced and consequently the customer may buy his wiper blades at a lower price. On the other hand, the sale of the wiper blades is simplified and, by means of appropriate removable connectors, the customer may adapt a wiper blade designed for a dorsal fitting to a wiper arm designed for a lateral fitting and vice-versa.

A first object of the present invention is therefore to provide a removable lateral connecting device.

A second object of the invention is to provide a lateral connector which is easily connected to and disconnected from the wiper blade as well as from the wiper arm.

A third object of the invention is to provide a lateral connector which is easily connected to and disconnected from a wiper blade initially designed for a dorsal fitting of the wiper arm.

The connecting device according to the invention thus makes it possible to connect a wiper blade designed for a dorsal fitting to a wiper arm designed for a lateral fitting, such as described above. The wiper blades designed for a dorsal fitting generally being provided with a substantially rectangular opening in the central portion of their superstructure, the connecting device according to the invention is characterized in that into said opening are snap-fitted one or several resilient parts, one of which being provided either with two short coaxial pins, or with a sole pin, the two pins or said sole pin co-operating with the bore and possibly with the flexible spring clip of the wiper arm in order to maintain said arm in its working position with respect to the superstructure of the wiper blade.

In the embodiment comprising two short pins, these pins may be located either above or laterally to the superstructure of the wiper blade. In both cases, once the wiper arm has been mounted on the two pins, it is maintained thereon by the flexible spring clip which automatically places itself between said two pins.

In the embodiment comprising a sole pin, the pin may, for example, be mounted on the connecting device in such a way that its free end portion is directed towards and perpendicularly to one of the flanks of the wiper blade. Said flank of the wiper blade will maintain the wiper arm on said sole pin, once the connecting device has been fitted into the substantially rectangular opening of the superstructure of the wiper blade.

BRIEF DESCRIPTION OF DRAWINGS

Other characteristics and advantages of the invention will be more fully understood when reading the following portions of the specification in conjunction with the accompanying drawings wherein:

FIG. 1 is a perspective view of a wiper arm end portion;

FIG. 2 is a sectional view along line II—II of FIG. 1;

FIG. 3 is a perspective view of the central portion of the superstructure of the wiper blade;

FIG. 4 and FIG. 5 are perspective views of the resilient parts of the connecting device according to a first embodiment of the invention;

BEST MODE FOR CARRYING OUT THE INVENTION

Figure 6:
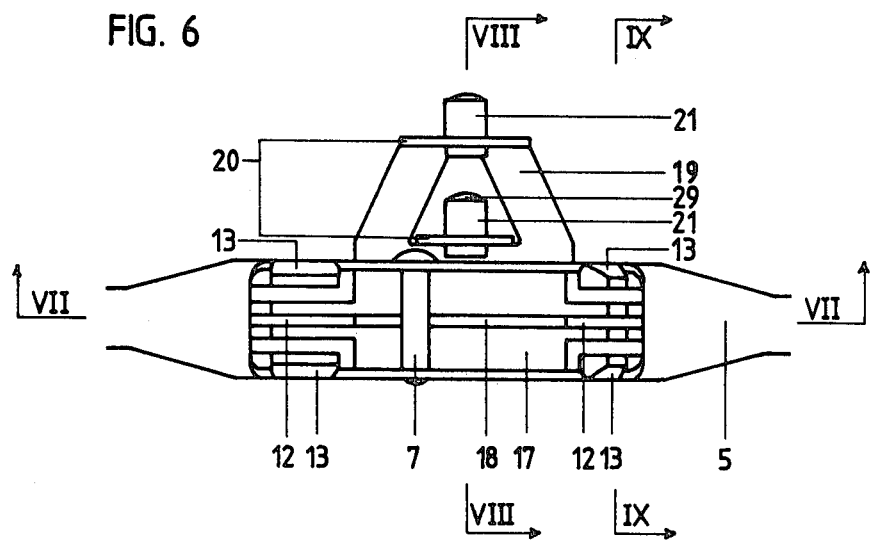
FIG. 6 is a plan view of the connecting device according to FIGS. 4 and 5, mounted on the superstructure of the wiper blade.
Figure 7:
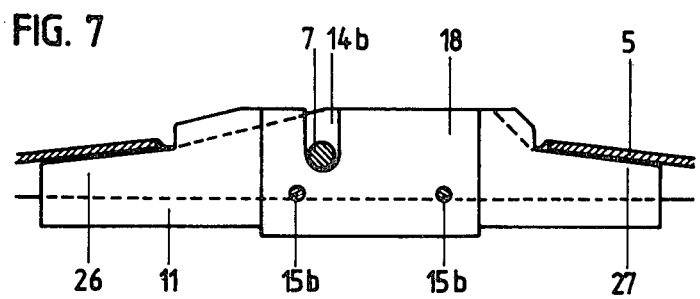
FIG. 7 is a sectional view along line VII—VII of FIG. 6.

FIGS. 1 and 2 show the free end portion of the wiper arm 1 which is to be linked to the central portion of the superstructure 5 of the wiper blade shown on FIG. 3.

The free end portion of the wiper arm 1 comprises two lateral bores 2 and a flexible spring clip 3 which projects from a frontal opening 4. This type of wiper arm is generally attached to a wiper blade which is provided with a lateral pin on which the wiper arm 1 is mounted by introducing said lateral pin into the two bores 2 of the wiper arm 1. When mounting the wiper arm 1 on the pin, the flexible spring clip 3 is pushed upwards and as soon as the wiper arm 1 is mounted completely on the pin, the flexible spring clip 3 is released and places itself automatically in an annular groove provided in the center portion of said pin, thus preventing any axial movement of the wiper arm 1 with respect to the pin.

The central portion of the superstructure 5 of a wiper blade, designed for a dorsal fitting, such as shown on FIG. 3, essentially comprises a substantially rectangular opening 6 provided at its upper portion or web with a rivet 7 which links together the two flanks 8 of the wiper blade and which is necessary for connecting other types of wiper arms to the wiper blade.

The present invention relates to a connecting device associating the wiper arm 1 to the superstructure 5, i.e., in other words, the connecting device according to the invention will have to maintain the wiper arm 1 in its working position with respect to the superstructure 5. Furthermore, said device ought to be easily connected to and disconnected from not only the superstructure 5, but also from the wiper arm 1.

A first embodiment of the connecting device according to the invention is shown on FIGS. 4 to 9. The connecting device according to this first embodiment comprises three parts 10, 11, 23 of which the first two 10, 11 are combined to form part 22 and are relatively resilient and made, for example, out of an appropriate plastic material, the third part 23 being relatively non-resilient or even preferably practically rigid and made, for example, out of steel.

The two first parts 10,11 are substantially symmetrical with respect to the central longitudinal plane VII—VII (FIG. 6) of the superstructure 5 of the wiper blade and are provided with hollows or slots 16, 24, 25 which increase their resiliency, more especially in those places where the parts 10,11 end with the sidewardly extending hooks 13 which are adapted to rest on the two upper ridges 9a of the wiper blade, once all three resilient parts 10,11,23 are mounted on the superstructure 5 of the wiper blade.

Before mounting the two first resilient parts 10,11 on the superstructure 5 of the wiper blade, the flank 18 of part 23 is introduced into the space 12 between said first resilient parts 10,11 and is secured thereto definitively by any appropriate means, such as, for example, by screws or rivets which pass through the holes 15a of said first parts 10,11 and through the holes 15b of part 23. It is to be noted that in their central portion 17 where part 23 is secured to the two first resilient parts 10,11, said two parts are not provided with hollows or slots in order to guarantee a sufficient rigidity to the entirety of the three parts which form the connecting device. Lastly, the groove 14a in the parts 10,11 and the groove 14b in the part 23 have no other function than to serve as a housing to the rivet 7 and they do not necessarily interfere in the fitting of the connecting device in the opening 6 of the superstructure 5 of the wiper blade.

Part 23 is substantially stirrup-shaped, with the flank 18 introduced, as explained above, between the two resilient parts 10,11, and with a web 19 connected to the flank 18 and having two short support flanks 20 extending upwardly from said web. Two short coaxial pins 21 extend perpendicular to the support flanks 20 with the free end portions of the pins directed away from the flank 18.

The assembly of the three parts 10, 11, 23 on the superstructure 5 of the wiper blade is made from beneath by laterally compressing parts 10,11 near the hooks 13. Once the connecting device is completely introduced into the opening 6 of the superstructure 5 of the wiper blade, it is kept in place by the hooks 13 which, because of their resiliency, will rest on the upper edges 9a of the superstructure 5 of the wiper blade. On the other hand, any displacement or rotation of the connecting device with respect to the superstructure 5 is made impossible by the two end portions 26,27 (FIG. 7) of said device, these end portions projecting indeed beneath the web of said superstructure 5, beyond the opening 6.

It is quite evident that the disassembly of the connecting device according to this first embodiment is done quite easily in first pushing the hooks 13 toward the longitudinal axis of the opening 6 and in then pushing the whole device downwards.

Figure 8:
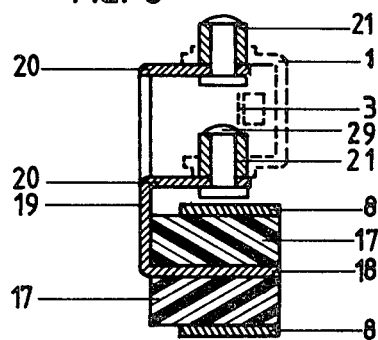
FIG. 8 is a sectional view along line VIII—VIII of FIG. 6.
Figure 9:
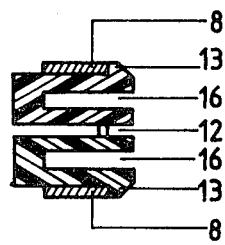
FIG. 9 is a sectional view along line IX—IX of FIG. 6.

FIGS. 6 and 8 show the situation of the short pins 21 with respect to the superstructure 5 of the wiper blade and also with respect to the wiper arm 1 which is shown in a sectional view on FIG. 8. According to FIG. 8, the flexible spring clip 3 of the wiper arm 1, in being placed between the free end 29 of one of the pins 21 and the support flank 20 of the other pin, prevents any axial movement of the wiper arm 1 with respect to the two pins 21.

For mounting the wiper arm 1 on the pins 21, the flexible spring clip 3 (FIG. 1) is pushed upwards and the flank of the arm 1 which is closest to the superstructure 5 is introduced between the free end 29 (FIG. 8) of one of the pins 21 and the support 20 of the other pin 21, until the two pins 21 are in front of the bores 2 of said wiper arm 1. The arm 1 is then pushed onto the pins 21, i.e. towards the superstructure 5. The flexible spring clip 3, when released, places itself between the two pins 21 and thus the wiper arm 1 is maintained in its working position with respect to the superstructure 5 of the wiper blade. The dismounting of the wiper arm 1 is done just as easily in operating in the reverse order.

This first embodiment of the present invention may of course be realized under numerous other forms in varying, for example, the number of parts, the form of these parts and/or the way to block the connecting device in the opening 6 of the superstructure 5 of the wiper blade.

Figure 10:
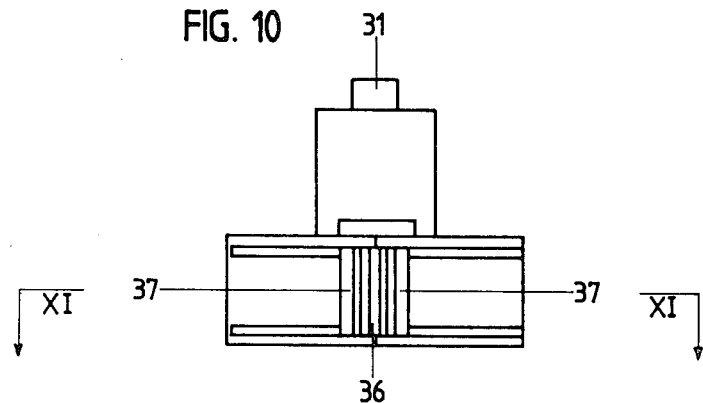
FIG. 10 is a bottom view of the connecting device according to a second embodiment of the invention.
Figure 11:
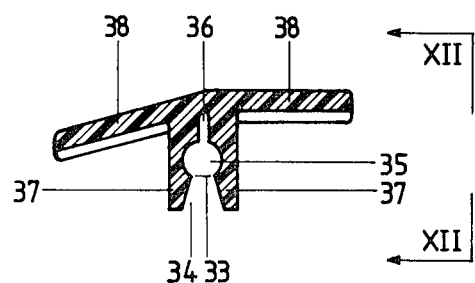
FIG. 11 is a sectional view along line XI—XI of FIG. 10.
Figure 12:
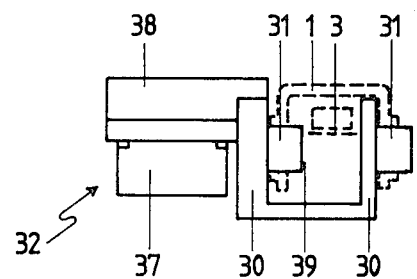
FIG. 12 is a side view looking in the direction of the arrow XII of FIG. 11.

A second embodiment of the connecting device according to the invention is shown on FIGS. 10 to 12.

In this embodiment, the connecting device is made of one part 32, for example, of a plastic material. The device is snap-fitted onto the rivet 7 of the superstructure 5 of the wiper blade in introducing it into the channel 34 and forcing it to spread the blocking means 37 which, thanks to the resiliency of the plastic material and to the slot 36, resiliently move apart and let the rivet 7 pass the throat 33 into position in the cylindrical bore 35. In order to avoid any rotation of the connecting device round rivet 7, projections 38 are provided at its upper portion, which rest on the upper ridges 9a of the superstructure 5, on both sides of rivet 7.

Just as in the first embodiment, the connecting device is provided with two short pins 31 located laterally with respect to the superstructure 5 and which maintain the wiper arm 1 in its working position thanks to its flexible spring clip 3 which places itself between the free end 39 of one of the pins 31 and the support 30 of the other pin 31.

Figure 13:
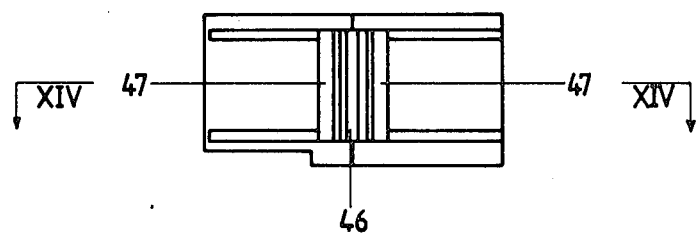
FIG. 13 is a bottom view of the connecting device according to a third embodiment of the invention.
Figure 14:
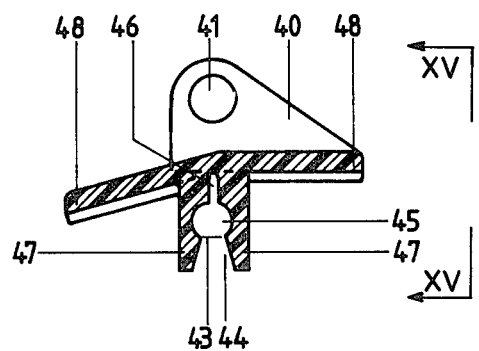
FIG. 14 is a sectional view along line XIV–XIV of FIG. 13.
Figure 15:
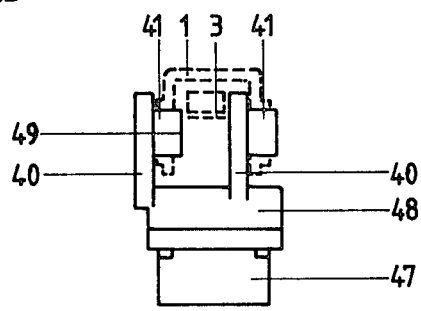
FIG. 15 is a side view looking in the direction of the arrow XV of FIG. 14.

A third embodiment of the connecting device according to the invention is shown on FIGS. 13 to 15.

This connector is made of one part 42 and is similar to the connector of FIGS. 10 through 12, except that the two short pins 41 project from the support flanks 40 and are located above the superstructure 5 of the wiper blade. More precisely, the pins 41 are just above the cylindrical bore 45 which seats over the rivet 7 of the superstructure 5 of the wiper blade. The device is snap-fitted onto the rivet 7 of the superstructure by aligning the rivet 7 with the channel 44 and forcing the device toward the rivet 7 to spread the blocking means 47 until the rivet passes the throat 43 and seats in position in the cylindrical bore 45. The projections 48 seat on the upper ridges 9a of the superstructure. The pins 41 have free end portions 49 facing away from the support flanks 40.

In the three embodiments described above, the connecting device is always provided with two short pins 21, 31, 41. It is, however, also possible to realize the same device with only one pin, possibly associated with other means for keeping the wiper arm in its working position with respect to the wiper blade.

A modification of the first embodiment of FIGS. 1 through 9, with only one pin is characterized in that said pin is located laterally with respect to the superstructure 5 of the wiper blade and that its free end portion is directed towards and perpendicularly to the plane VII—VII of the wiper blade, so that, after mounting the wiper arm 1 on said pin and after snap-fitting the connecting device into the opening 6 of the superstructure 5 of the wiper blade, the flank 8 of the wiper blade maintains the wiper arm 1 in its working position.

A second modification of the first embodiment of FIGS. 1 through 9 with only one pin consists in providing one of the resilient parts with a pin which is perpendicular to the plane VII—VII of FIG. 6 of the wiper blade and the free end of which being directed towards the wiper arm. This pin is provided with an annular groove into which fits the flexible spring clip 3 of the wiper arm. Such a pin may, for example, replace part 23 (FIG. 5). Once the connecting device according to this embodiment has been mounted onto the superstructure 5, the sole pin will be located at the height of the rivet 7 in a slot 7a (FIG. 3) provided in the flank 8 of the superstructure 5 of the wiper blade.

A third modification of the first embodiment of FIGS. 1 through 9 with only one pin is similar to the preceding one, but the sole pin has a uniformly circular cross section over all its length, i.e. said pin is not provided with an annular groove. However, the pin is co-operating with a resilient hook which keeps the wiper arm in its working position by gripping one of the flanks of said arm.

It will be understood that the invention is not limited to the exact construction shown and described, but that various changes and/or modifications may be made without departing from the spirit and scope of the invention as defined in the appended claims.

We claim:

1. A connecting device between the superstructure of a wiper blade and the free end portion of a wiper arm wherein the upper central portion of said superstructure is provided with a substantially rectangular opening and wherein said wiper arm has a bore (2) and a flexible spring clip (3), characterized in that at least one relatively resilient part (10,11 32,42) is snap-fitted into said opening (6), means (13,38,48) carried by the first part (10,11 32,42) cooperating with the edge of said opening (6) for positioning said first part in said opening, one other part (23,30,40) being carried by said first part and being provided with holding means (21,31,41) capable of cooperating with the bore (2) and flexible spring clip (3) on the free end portion of the wiper arm (1) such as to maintain said arm (1) in its working position with respect to the superstructure (5) of the wiper blade.

2. A connecting device according to claim 1, characterized in that said one other part (23,30,40) is provided with two short coaxial pins (21,31,41), said two coaxial pins (21,31,41) being capable of co-operating with the bore (2) in the free end portion of the arm and with the flexible spring clip (3), which is provided with certain types of wiper arms (1) designed for a lateral fitting.

3. A connecting device according to claim 1 wherein said other part (23,32) provided with said holding means is characterized by said holding means being coaxial pins (21,31) extending laterally with respect to the superstructure (5) of the wiper blade.

4. A connecting device according to claim 1 wherein said one part (42) provided with said holding means is characterized by said holding means being coaxial pins (41) located above the superstructure (5) of the wiper blade.

5. A connecting device according to one or the other of claims 3 and 4, characterized in that the coaxial pins (21,31,41) are directed both in the same direction and that their common axis is perpendicular to the central longitudinal plane (VII—VII) of the superstructure (5) of the wiper blade.

6. A connecting device according to one or the other of claims 3 and 4, characterized in that the distance between a free end portion (29,39,49) of one of the pins (21,31,41) and a support (20,30,40) of the other pin is equal to or slightly greater than the width of the flexible spring clip (3) of the wiper arm (1).

7. A connecting device according to claim 2, characterized in that the resiliency of said resilient parts (10,11,32,42) is such as to permit snap-fitting into the opening (6) of the superstructure (5) of the wiper blade, and at the same time to be sufficiently rigid to support the two coaxial pins (21,31,41).

8. A connecting device according to claim 2, characterized in that the resilient parts (10,11,32,42) are snap-fitted onto the upper edge (9a) of said central portion by means of appropriate overhanging hooks (13) on said parts.

9. A connecting device between the superstructure of a wiper blade and the free end portion of a wiper arm wherein the upper central portion of said superstructure is provided with a substantially rectangular opening, and wherein said wiper arm has a bore (2) and a flexible spring clip (3), characterized in that at least one part (10,11,23,32,42) is snap-fitted into said opening (6), one other of said parts (23,32,42) being provided with holding means (21,31,41) capable of cooperating with the bore (2) and flexible spring clip (3) on the free end portion of the wiper arm (1) such as to maintain said arm (1) in its working position with respect to the superstructure (5) of the wiper blade, said one other of said parts (23,32,42) is provided with two short coaxial pins (21,31,41), said two coaxial pins (21,31,41) being capable of co-operating with the bore (2) in the free end portion of the arm and with the flexible spring clip (3), which is provided with certain types of wiper arms (1) designed for a lateral fitting, said at least one part being two parts (10,11) which are of a relatively high resiliency, said two parts (10,11) are substantially symmetrical with respect to the central longitudinal plane (VII- —VII) of the wiper blade, one said other part (23) with a negligible resiliency has the form of a stirrup, one of the flanks (18) of which is blocked between said two highly resilient parts (10,11).

10. A connecting device according to claim 9, characterized in that said substantially symmetrical parts (10,11) have a variable cross-sectional profile provided with hollows or slots (16,24,25) which increase their resiliency.

* * * * *

UNITED STATES PATENT AND TRADEMARK OFFICE
CERTIFICATE OF CORRECTION

PATENT NO. : 4,343,064
DATED : AUGUST 10, 1982
INVENTOR(S) : JOHAN H. van den BERG, GUISEPPE MAIOCCO It is certified that error appears in the above-identified patent and that said Letters Patent are hereby corrected as shown below:

Page 1 of the Letters Patent, change the name of the Assignee to read -- Arman S.p.A.,
(TO) Druento, Italy --

Column 1, line 38, change "manufacture" to -- manufacturer --

Signed and Sealed this

First Day of February 1983

[SEAL]

Attest:

GERALD J. MOSSINGHOFF

Attesting Officer

Commissioner of Patents and Trademarks